(12) United States Patent
Everett et al.

(10) Patent No.: US 6,442,325 B1
(45) Date of Patent: Aug. 27, 2002

(54) XBOX OPTICAL ADAPTER

(75) Inventors: Rusty R. Everett, San Mateo; Kendrew Lee, Fremont; Yasuhiro Yamamoto, San Francisco, all of CA (US)

(73) Assignee: Monster Cable Products, Inc., Brisbane, CA (US)

( * ) Notice: Subject to any disclaimer, the term of this patent is extended or adjusted under 35 U.S.C. 154(b) by 0 days.

(21) Appl. No.: 09/982,523

(22) Filed: Oct. 17, 2001

(51) Int. Cl.[7] .................................................. G02B 6/00
(52) U.S. Cl. ...................................... 385/147; 439/502
(58) Field of Search ................................ 385/147, 136; 439/502, 638

(56) References Cited

U.S. PATENT DOCUMENTS

| | | | | |
|---|---|---|---|---|
| 5,702,261 A | * | 12/1997 | Wang | 439/188 |
| 6,109,797 A | * | 8/2000 | Nagura et al. | 385/88 |
| 6,203,344 B1 | * | 3/2001 | Ito | 439/218 |
| 6,217,228 B1 | * | 4/2001 | Samela et al. | 174/35 C |
| 6,250,936 B1 | * | 6/2001 | Armistead et al. | 333/24 R |
| 6,305,961 B1 | * | 10/2001 | Szilagyi et al. | 439/271 |

* cited by examiner

*Primary Examiner*—Tulsidas Patel
(74) *Attorney, Agent, or Firm*—LaRiviere, Grubman & Payne, LLP

(57) ABSTRACT

An XBOX optical connector has a miniature phone plug at one end of an adapter cable. The phone plug plugs into a jack provided in a console connector that plugs into the console of an XBOX game machine. A semiconductor laser modulator optical transmitter that modulates digital audio signal data onto a laser light beam is provided. The optical transmitter is powered by 5 volts dc received from the game console. The digital audio signal data is received from the game console, is conducted by the adapter cable, and provided to a television set by means of an optical connector provided at the other end of the adapter cable.

1 Claim, 5 Drawing Sheets

XBOX OPTICAL ADAPTER

TECHNICAL FIELD OF THE INVENTION

The present invention relates to cabling between a game machine console and a television set and, more particularly, to an adapter employing fiber optics to conduct digital audio signals from a game machine to a television set.

BACKGROUND OF THE INVENTION

Microsoft has developed a game machine called XBOX which has a console that connects to a television set by means of a special cable referred to as a "High Definition AV Pack". This "pack" connects the console of the XBOX game machine to standard or high definition ready television sets that support 480 pixel, 720 pixel, and 1080i component video signals, analog audio inputs, and/or digital receivers or to audio systems. This "High Definition AV Pack" comprises a multiconductor cable with a console connector at one end, and a connector connector block at the other end having a plurality of RCA connector jacks. Additional cables connect from the connector block to the television set. The connector block has a fiber optic connector at one end to provide for using a fiber optic cable to conduct digital audio to the television set.

This "High Definition AV Pack" provided by Microsoft for use between the XBOX game machine console and a high definition ready television set is cumbersome, inconvenient, expensive and confusing. It requires the purchase of extra cables to connect from the RCA connector jacks in the connector block to the television set. Accordingly, there is a need for an improved XBOX optical adapter that eliminates the foregoing disadvantages of the Microsoft cable.

SUMMARY OF THE INVENTION

In accordance with the principles of the present invention, there is provided a console connector cable that connects directly to the television set. The cable has a console connector at one end, and has connectors that mate with the connectors on the television set at the other end. For those audio systems that support digital audio, a special optical adapter is provided. It comprises an adapter cable having a miniature phone plug at one end that plugs into a jack provided in the console connector. At the other end, the adapter cable is provided with a fiber optic connector that mates with a fiber optic connector provided on the audio systems. The connector includes a semiconductor laser modulator.

DETAILED DESCRIPTION OF THE PREFERRED EMBODIMENT

Figure 1:
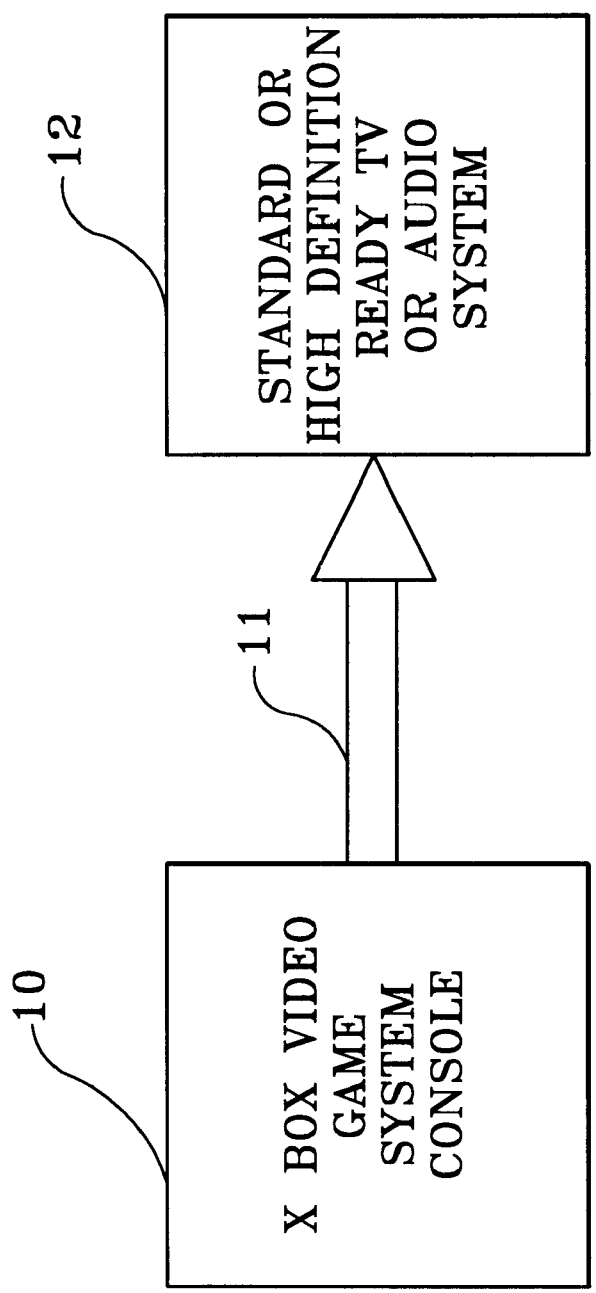
FIG. 1 is a block diagram showing a game machine connected to a television set or audio system.

FIG. 1 is a block diagram illustrating a game machine 10 connected by a cable 11 to a television set or audio system 12. In the preferred embodiment, the game machine 10 is of the type referred to as the XBOX manufactured by Microsoft. The primary purpose of the game machine 10 is to permit the user to play high tech games, but it may also be used to play music via a CD player and to play movies via a DVD player. The television set or audio system 12 may be a high definition ready television that supports 480 pixel, 720 pixel, or 1080i component video signals, analog audio inputs, and/or digital receivers. Alternatively, the television set 12 may be a home theater video projector with stereo surround sound, or other types of television sets or monitors. The cable 11 may be a "High Definition AV Pack" or any other multiconductor cable having a console connector at one end to connect to the game machine 10, and being adapted to connect to the television set or audio system 12 at the other end. The cable 11 may also include a fiber optic cable to conduct digital audio from the game machine 10 to a television set or audio system 12 that supports digital audio.

Figure 2:
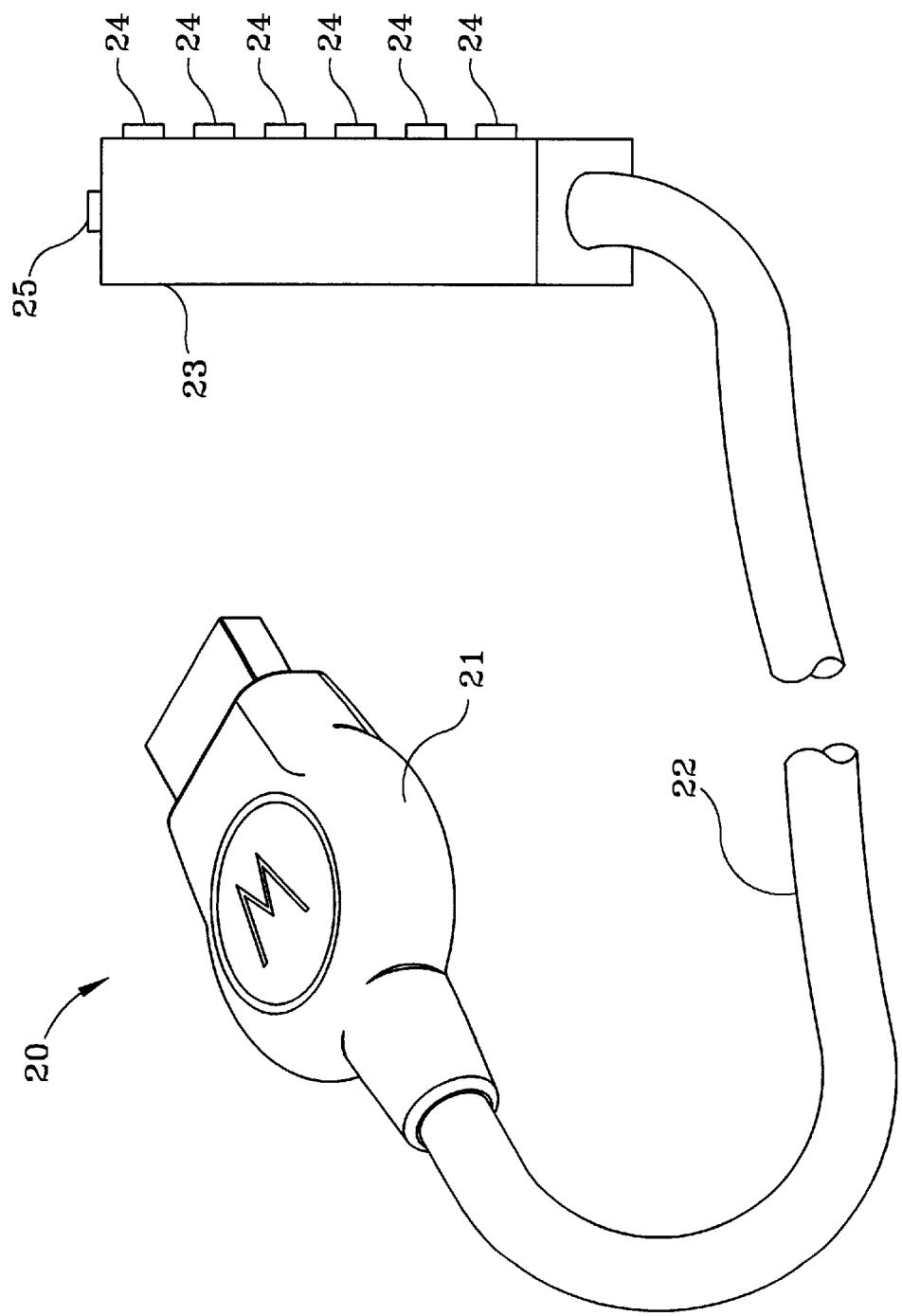
FIG. 2 is a schematic view of a "High Definition AV Pack" of the type provided by the manufacturer of the game machine for use to connect between the game machine and the television set shown in FIG. 1.

Referring now to FIG. 2, there is shown a schematic diagram of an XBOX "High Definition AV Pack" 20 as provided by the manufacturer of the game machine 10. The "High Definition AV Pack" 20 comprises a console connector 21, a multiconductor cable 22 connected to the console connector 21, and a connector block 23 connected to the other end of the multiconductor cable 22. The connector block 23 is provided with a plurality of RCA connector jacks 24, and an optical connector 25 at one end.

Figure 3:
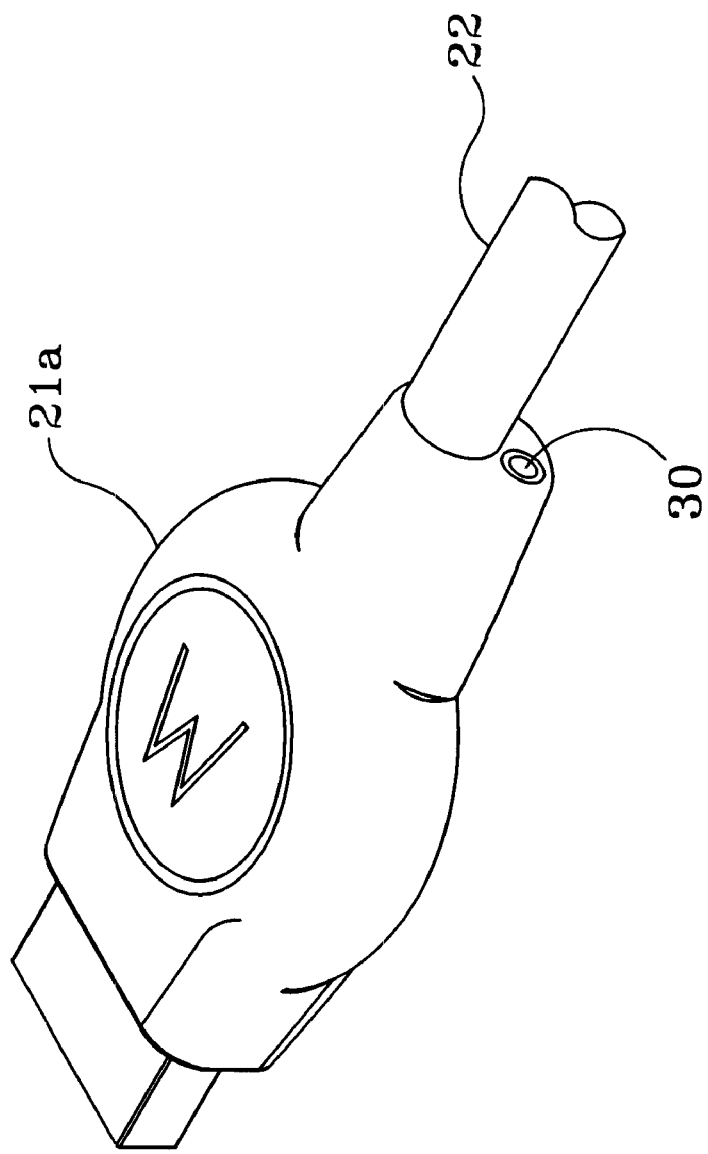
FIG. 3 is a schematic view of a console connector modified by the addition of a jack provided to receive a miniature phone plug.
Figure 4:
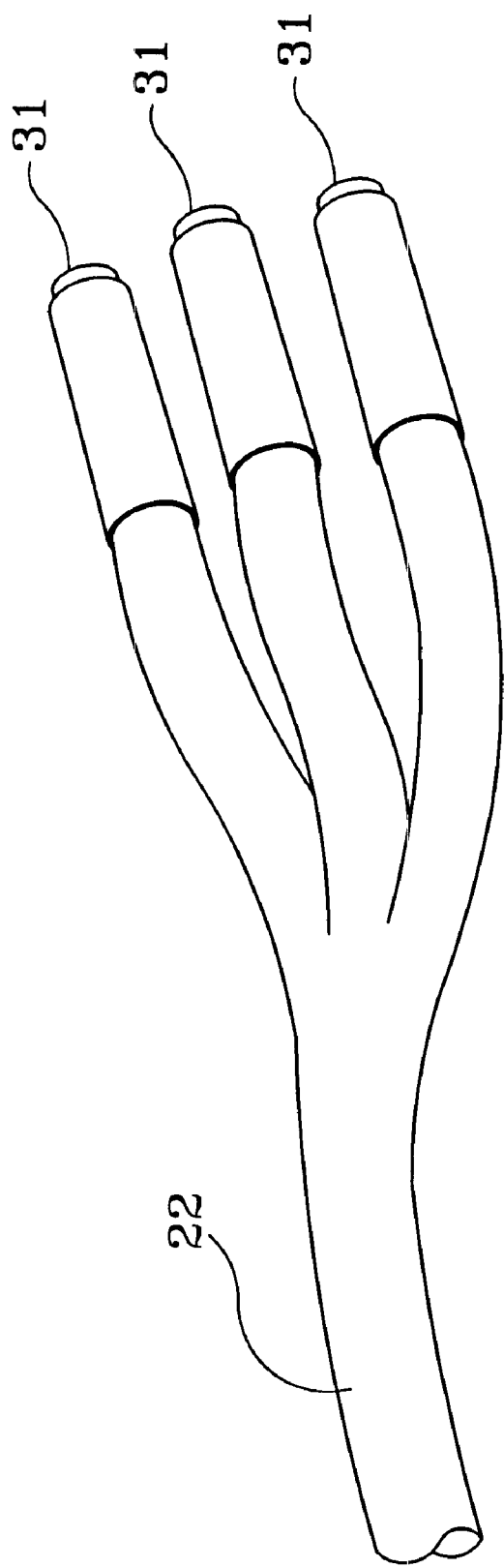
FIG. 4 is a schematic view of the connectors employed to connect the console connector of FIG. 3 to the television set of FIG. 1.
Figure 5:
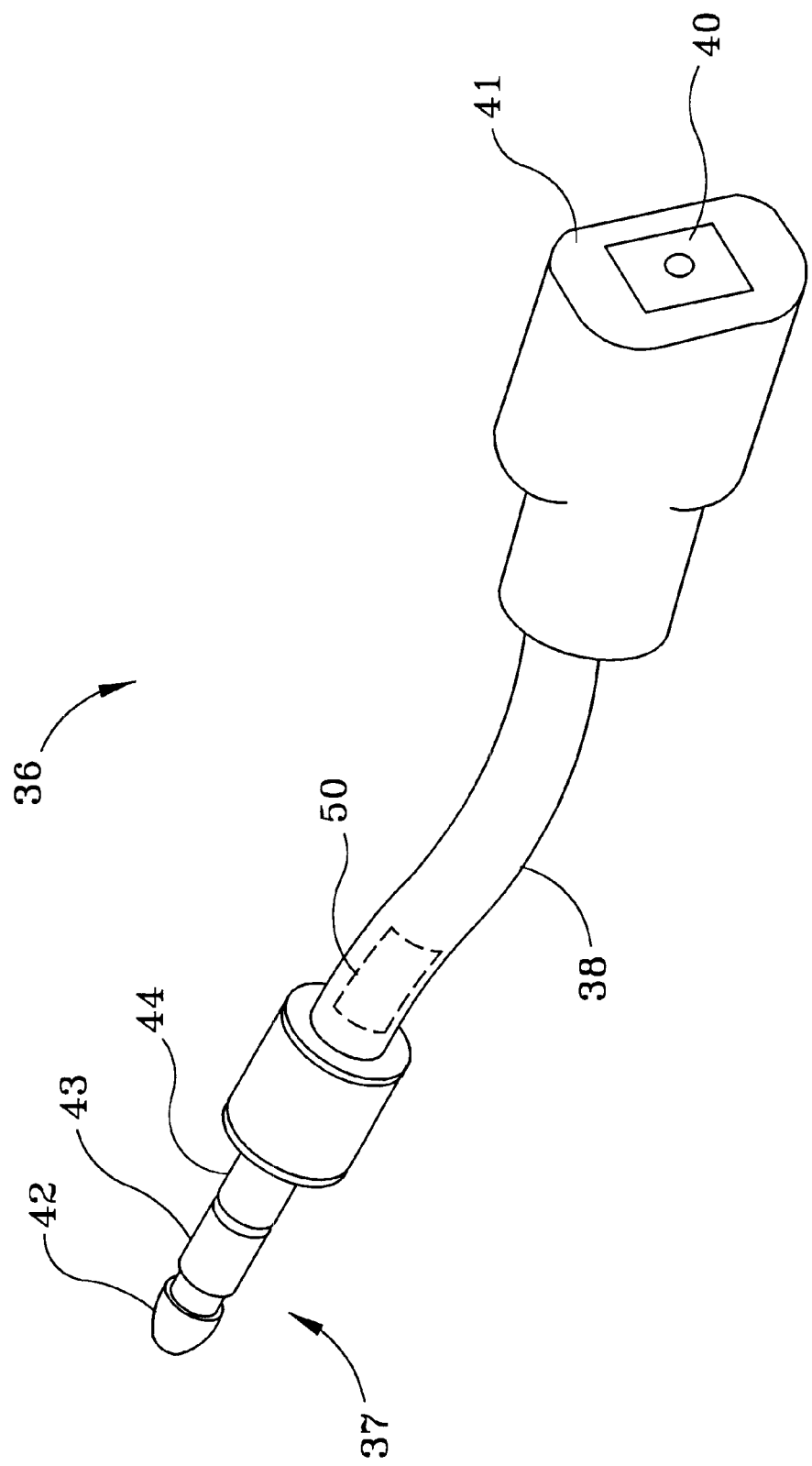
FIG. 5 is a schematic view of an XBOX optical adapter that plugs into the jack seen in FIG. 3 and terminates in an optical connector that connects to the television set or audio system shown in FIG. 1.

Referring now to FIG. 3, there is shown a schematic view of a modified console connector 21a provided with a jack 30 for receiving a miniature phone plug. Referring now to FIG. 4, there is shown a schematic view of connectors 31 employed to connect the console connector 21a of FIG. 3 to the television set or audio system 12 of FIG. 1. Referring now to FIG. 5, there is shown a schematic diagram of an XBOX optical adapter 36 that is provided with a miniature phone plug 37 that plugs into the jack 30 shown in FIG. 3. The optical adapter 36 employs an adapter cable 38 that terminates in an optical connector 40 that connects to the television or audio system 12 shown in FIG. 1. The optical connector 40 is a standard rectangular connector of the type conventionally used to terminate fiber optic cables known as a TOS link fiber optic transmitter. The optical connector 40 is mounted in a terminating block 41 attached to the adapter cable 38. The terminating block 41 contains a semiconductor laser modulator optical transmitter 50, represented as a dashed block, that modulates digital audio signals onto a laser light beam. The miniature phone plug 37 is a standard stereo mini plug having a tip 42, a ring 43, and a sleeve 44. The miniature phone plug is 2.5 mm in diameter. It receives 5 volts dc on the tip 42 to power the semiconductor laser modulator optical transmitter that is within the terminating block 41. The ring 43 conducts the digital audio data. The sleeve 44 is the ground connection for the 5 volts dc and for the digital audio data.

Thus, there has been described an XBOX optical adapter 36 in accordance with the present invention for use with an XBOX game machine 10 to conduct digital audio signals to a television set 12 that supports digital audio signals. The XBOX optical adapter 36 of the present invention provides better performance, and is cheaper, more convenient and less confusing than the cables used heretofore.

It will be appreciated by those skilled in the art that there can be departure from the specific embodiment of the invention described herein without departing from the true scope of the claims appended hereto.

We claim:

1. An XBOX optical adapter comprising:

a console connector;

a jack for receiving a miniature telephone plug mounted in said console connector;

a miniature telephone plug for plugging into said jack in said console connector;

a cable operatively connected to said miniature telephone plug for receiving digital audio data signals;

a terminating block containing an optical connector coupled to said cable; and a semiconductor laser modulator optical transmitter mounted within said terminating block for modulating said digital audio data signals onto a laser light beam.

* * * * *